United States Patent
Pollack et al.

(10) Patent No.: US 8,881,436 B2
(45) Date of Patent: Nov. 11, 2014

(54) FLUID-TIGHT END FITTING FOR A COMPOSITE HOSE AND METHOD OF ASSEMBLING A COMPOSITE HOSE ON SUCH END FITTING

(75) Inventors: Jack Pollack, Houston, TX (US); Jean-Pierre Queau, Nice (FR); Philippe Albert Christian Menardo, Nice (FR)

(73) Assignee: Trelleborg Industrie SAS, Clermont-Ferrand Cedex (FR)

( * ) Notice: Subject to any disclaimer, the term of this patent is extended or adjusted under 35 U.S.C. 154(b) by 1063 days.

(21) Appl. No.: 12/988,115

(22) PCT Filed: Apr. 15, 2009

(86) PCT No.: PCT/EP2009/054449
§ 371 (c)(1),
(2), (4) Date: Nov. 16, 2010

(87) PCT Pub. No.: WO2009/127650
PCT Pub. Date: Oct. 22, 2009

(65) Prior Publication Data
US 2011/0048567 A1 Mar. 3, 2011

(30) Foreign Application Priority Data
Apr. 15, 2008 (EP) .................................. 08154556

(51) Int. Cl.
| | |
|---|---|
| *F16L 33/28* | (2006.01) |
| *F16L 33/22* | (2006.01) |
| *F16L 33/01* | (2006.01) |
| *F16L 59/14* | (2006.01) |

(52) U.S. Cl.
CPC ............... *F16L 33/228* (2013.01); *F16L 33/01* (2013.01); *F16L 59/141* (2013.01)
USPC ............... 38/109; 138/143; 138/104; 285/47; 285/222.2

(58) Field of Classification Search
USPC ............... 138/109, 104; 285/222.4, 294.3, 47
See application file for complete search history.

(56) References Cited

U.S. PATENT DOCUMENTS

| | | | |
|---|---|---|---|
| 2,219,047 A | | 10/1940 | MacLachlan |
| 4,132,382 A | * | 1/1979 | Jackson ........................ 251/5 |

(Continued)

FOREIGN PATENT DOCUMENTS

| | | |
|---|---|---|
| EP | 0855496 | 7/1998 |
| FR | 2356869 | 1/1978 |

(Continued)

OTHER PUBLICATIONS

International Search Report dated Sep. 7, 2009 in PCT application.

*Primary Examiner* — Patrick F Brinson
(74) *Attorney, Agent, or Firm* — Young & Thompson

(57) ABSTRACT

A composite hose includes a tubular body of flexible material for transferring cryogenic fluid through the hose and for preventing fluid leakage through the body. The tubular body includes an inner wire helix spirally wound along the length of the hose, an outer wire helix spirally wound along the length of the hose, at least two reinforcing layers placed in between the inner and outer wire, at least one sealing layer placed between two reinforcing layers, an end fitting at both ends of the tubular body, each end fitting provided with a part for connection to another hose flange and an elongated cylindrical part, which is divided in an anchoring area for anchoring the tubular body and a static sealing area for fluid tight sealing of the hose. A gas tight sealing is created by bonding the at least one sealing layer to the cylindrical part over a ring shaped bonding area.

23 Claims, 2 Drawing Sheets

(56) References Cited

U.S. PATENT DOCUMENTS

Figure 1:
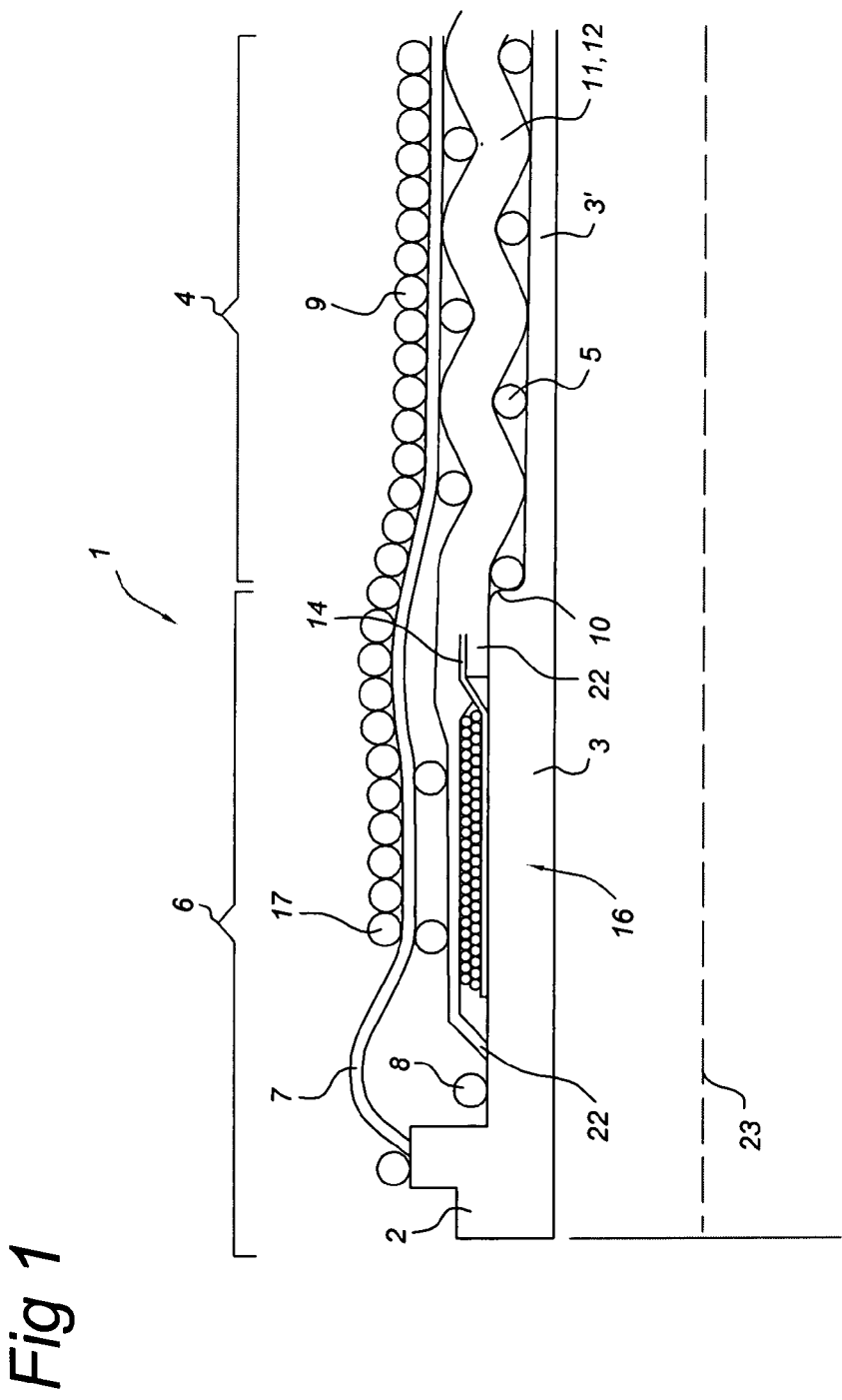

| | | | |
|---|---|---|---|
| 4,477,108 A * | 10/1984 | Castelbaum et al. | 285/222.4 |
| 7,243,686 B2 | 7/2007 | Burke et al. | |
| 7,631,667 B2 * | 12/2009 | Brink et al. | 138/109 |
| 2006/0201566 A1 * | 9/2006 | Brink et al. | 138/109 |

FOREIGN PATENT DOCUMENTS

| | | |
|---|---|---|
| GB | 715071 | 9/1954 |
| GB | 889092 | 2/1962 |
| GB | 2104992 | 3/1983 |
| JP | S532718 A | 1/1978 |
| JP | 03081478 U | 8/1991 |
| JP | 07029388 U | 6/1995 |
| JP | 08021578 A | 1/1996 |
| JP | 2000130681 A | 5/2000 |
| JP | 2002035140 A | 2/2002 |
| JP | 2004503732 A | 2/2004 |
| WO | 9605461 | 2/1996 |
| WO | 0196772 | 12/2001 |
| WO | 2004079248 A1 | 9/2004 |
| WO | 2006132532 A2 | 12/2006 |

\* cited by examiner

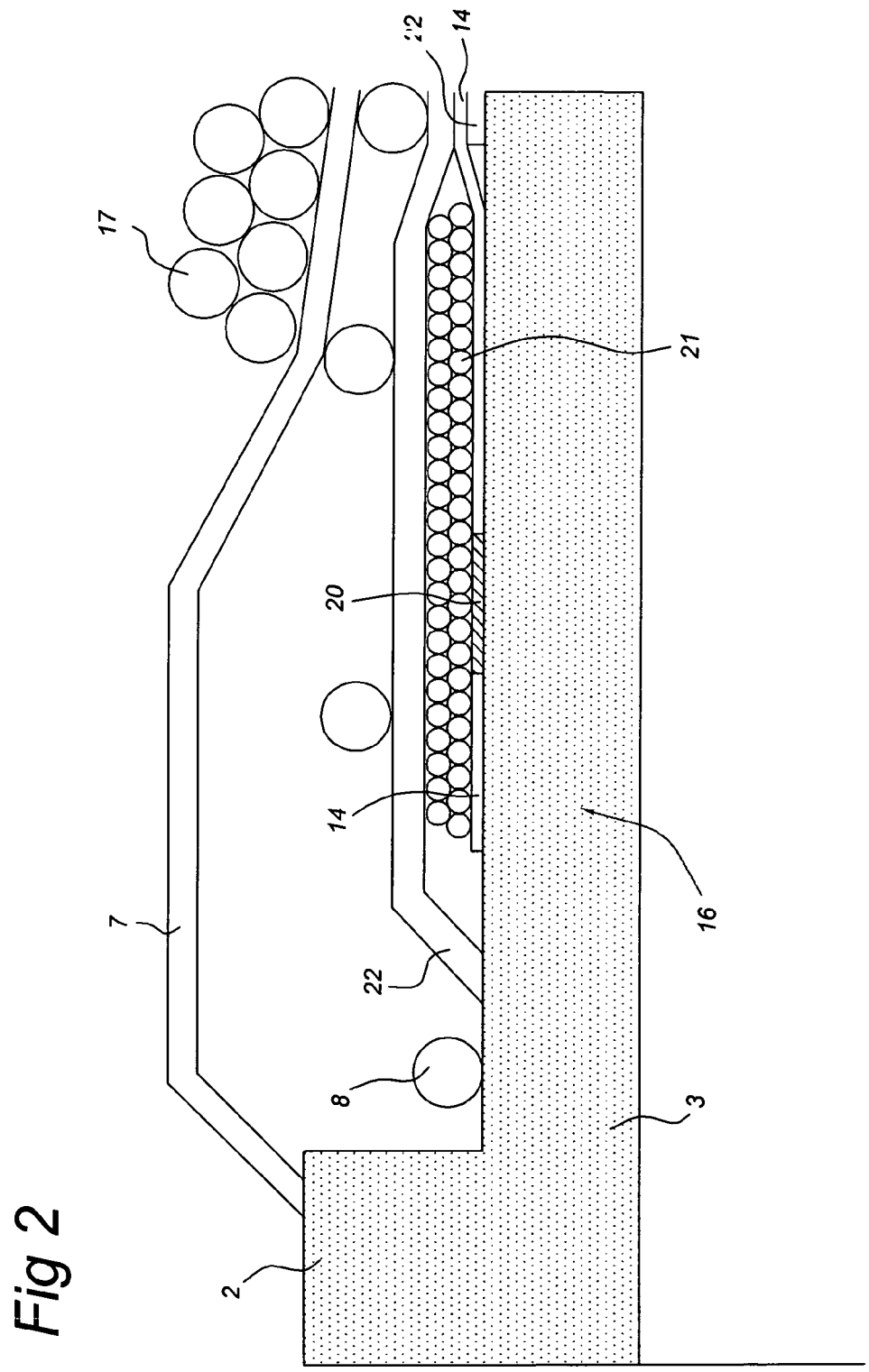

FLUID-TIGHT END FITTING FOR A COMPOSITE HOSE AND METHOD OF ASSEMBLING A COMPOSITE HOSE ON SUCH END FITTING

This invention relates to a fluid-tight end fitting for a composite hose for transfer of cryogenic fluids. (In this application it should be understood that cryogenic fluids means any kinds of liquefied gas including LNG, LPG, liquefied $CO_2$). The end fitting design enables a secured anchoring and fluid-tight sealing of the composite hose ends on the end fitting. The invention also relates to a method of assembling a composite hose onto such an end-fitting.

The invention is regarding a cryogenic transfer hose, which can be an aerial hose, a floating hose or submerged hose. In these last two cases the cryogenic transfer hose system comprises an inner composite hose and an outer hose situated some distance away from the inner hose wall. The invention relates to a composite hose comprising a tubular body of flexible material serving to transport cryogenic fluid through the hose and to prevent fluid leakage through the body, the tubular body comprising;
- an inner wire helix spirally wound along the length of the hose,
- an outer wire helix spirally wound along the length of the hose
- multiple reinforcing layers placed in between the inner and outer wire
- at least two sealing layers placed between two reinforcing layers
- an end fitting at both ends of the tubular body, each end fitting provided with a flange or connection means for connection to another composite hose connection means and an elongated cylindrical part. The cylindrical part of the end fitting is divided in an anchoring area for anchoring the inner wire and a static sealing area for fluid tight sealing of the hose.

It is well known to use a hose comprising a tubular body of flexible material arranged between inner and outer helically wound retaining wires. It is conventional for the two wires to be wound at the same pitch, but to have the windings displaced by half a pitch width from one another. The tubular body typically comprises inner and outer reinforcement layers with at least two intermediate sealing layers. The inner and outer layers and wires provide the structure with the mechanical strength to carry the fluid therein and give protection to the sealing layers.

Conventionally, the inner and outer layers of the tubular body comprise fabric layers formed of polyester such as polyethyleneterephthalate.

When a reinforcing layer comprises a polyolefin then it may be a polyethylene, polypropylene or polybutylene homopolymer, or a copolymer or terpolymer thereof, and is preferable monoaxially or biaxially oriented. Preferably the polyethylene is an ultra high molecular weight polyethylene (UHMWPE), such as that available under the trademark name DYNEEMA fabricated by DSM High Performance Fibres BV in the Netherlands The intermediate sealing layer, providing a seal to prevent the fluid from penetrating the hose, is typically a polymeric film.

The retaining inner and outer wires are typically applied under tension and placed within and on the outside surfaces of the tubular body. The retaining wires act primarily to preserve the geometry of the tubular body. Furthermore, the outer wire may act to restrain excessive hoop deformation of the hose under high pressure. The inner and outer wires may also act to resist crushing of the hose.

When assembling an end fitting and a composite hose together, it is necessary to anchor the composite hose to the end fitting and form a fluid-tight seal therebetween. Because of the nature of the hose construction, difficulties occur in obtaining these objectives and particularly in obtaining a permanent and reliable seal between the end fitting and the hose main body.

UK patent GB 2104992 in the name of TI Flexible Tubes LTD., shows a radial clamping means for a composite hose end fitting in which a tapered ferrule or swaged sleeve compresses an inner sleeve. To form a fluid-tight seal between the hose main body and the end fitting, the publication mentions to apply a resilient load to the compressed rubber sleeve so that the exposed layer of polymeric film material is plastically deformed against a radial projection. However, the disadvantage of such a construction is that if a radial compressive load is applied via a swaged sleeve, the load applied during swaging will have to be in excess of the load required for sealing purposes, because of spring back of the sleeve when the swaging load is removed. Therefore, this operation requires very large machines and the spring back effect is hard to avoid and hard to control.

Patent publication WO2004079248 in the name of BHP BILLITON PETROLEUM PTY LTD shows an alternative design for an end fitting for a composite hose. A similar end flange design is shown in U.S. Pat. No. 7,243,686 in the name of the same company.

The shown end fitting design is focused on the use of bolted retainers adapted to press an outer retaining member against an inner retaining member in order to retain each layer of the hose between the two retaining members. The end fitting shows an anchoring area and a sealing area, both provided with bolted clamps. In the sealing area radial compressive force is created by bolted clamps locking a sealing ring made of a different material. The axial clamping or swaging loads are transferred over the clamps via large outer bolts to the connector flange, again via bolts. This is required as in this composite hose design, hose extension is limited by additional axial strengthening means like a braid, and the large retaining forces need to be transferred from the braid to the end fitting connector flanges via these outer bolts. The disadvantage of such a design having multiple bolted connections is that the bolts tend to loosen themselves due to the large temperature variations between ambient and cryogenic temperatures. The use of bolt tension and/or swaging during assembling and use of the hose is hard to control and the bolt tension needs to be checked on a regular basis. Furthermore, this end flange design results in a heavy and relatively large diameter end flange which is disadvantageous for multi-segment aerial hoses as well as for a hose-in-hose design, as the outer hose needs to have a relatively large inner diameter as well.

The present invention is regarding end fitting design for a composite hose which provides a fluid-tight connection between the end fitting and a composite hose, and which is able to take up the axial forces acting on the composite hose. The end fitting according to the invention is further of a compact design, has an overall reduced radial outer diameter and is of a relatively light weight. This is advantageous as the reduced weight and dimensions of the complete end fitting is important for aerial hoses as well as for composite hoses that are used as an inner hose for a hose-in-hose cryogenic fluid transfer system.

Preferred embodiments of the invention will now be described with reference to the accompanying drawings, in which:

FIG. 1 shows a schematic cross sectional view of an end-fitting design for a composite hose according to the present invention FIG. 2 shows a detailed cross sectional view of the fluid-tight sealing area of the end fitting of another embodiment according to the present invention.

FIG. 1 shows a design of an end-fitting for a hose according to the present invention. The end fitting 1 is provided with a flange part 2 or connection means that could be a male-female sliding cylindrical sleeve connection, a bolted connection or any connection means as those described in the patent application WO2006/132532 filed by the applicant, for connection to another hose connection means and an elongated cylindrical part 3 for connection to a composite hose. This cylindrical part is tapered in the area 3' next to the tubular hose part. The cylindrical part is divided in an anchoring area 4 for anchoring the inner hose wire 5 of the composite hose and hence the tubular body, and a static sealing area 6 for fluid tight sealing of the hose.

FIG. 1 shows that the cylindrical part 3 of the end fitting 1 is provided with a step 10 between the sealing area 6 and the anchoring area 4. Hence the cylindrical part 3 in the sealing area 6 has a larger diameter than in the anchoring area 4. The difference of diameter between the sealing area 6 and the anchoring area 4 corresponds to the diameter of the inner wire 5. FIG. 1 shows that the inner wire 5 is connected to the cylindrical part 3 only in the anchoring area 4 but is not present in the sealing area 6. The step 10 can be used as an abutment to avoid the inner wire 5 to slip. The inner wire 5 can be directly welded on the surface of the cylindrical part 3 or alternatively the cylindrical part can be provided with a helical small groove to receive the inner wire spirals. In the anchoring area 4, between the inner wire 5 and the outer wire 8, there is a bundle of layers 11 consisting of multiple reinforcing layers 22 made of polyester or polyethylene (UHMWPE) material which could be mono-, bi or triaxially oriented and with at least one sealing layer 14 made of polymeric films placed between the reinforcing layers (see also FIG. 2).

FIG. 1 shows between the step 10 and the connection flange part 2, a sealing area 6. The sealing area 6 can consist of one or more sealing zones.

FIG. 1 shows as an example, one sealing zone 16. This sealing zone 16 is the landing and sealing area for a pack 14 consisting of one or more sealing layers. In case there are more packs of sealing layers, there can be more sealing zones, each one provided to have a landing and sealing zone for a pack of one or more sealing layers. In another embodiment each subsequent sealing zone could also be stepped up one to the other in the same way of the cylindrical part 3 having a step 10. One sealing zone configuration is shown in greater details in FIG. 2.

An outer hose wire 8 which continues over the entire composite hose, continues also over the anchoring area 4 and the sealing area 6 of the cylindrical part 3; this way the outer wire 8 provides an inward radial compression force on the sealing layers in the sealing area 6 and locks with the help of the inner hose wire 5, all hose layers in the anchoring area 4.

All static and dynamic loads and forces acting on the composite hose are transferred to the anchoring area 4 of the cylindrical part 3 of the end fitting (and vice versa) so that the sealing area 6 of the cylindrical part is kept free from these loads and forces.

In each area 4, 6 an additional outer wire pack 9, 17 is added, consisting of one or more layers of helically compact wrapped steel wire which can have a diameter similar to the one of the inner or outer hose wire 5, 8. The outer wire pack could be continuous over the two areas or there could be one outer wire pack 9 for the anchoring area and another outer wire pack 17 for the sealing area. The outer wire pack 9 is used to add a radial compression force on the outer wire 8 of the composite hose in the anchoring area 4 and the additional outer wire pack 17 is used to add a radial compression force on the outer wire 8 of the composite hose in the sealing area 6.

A deformable metal sheet or ferrule 7 is near the connection means part 2 attached to the cylindrical part 3, and is placed between the outer wire 8 and the additional outer wire packs 9, 17.

The additional outer wire packs 9, 17 add an additional inward radial force and squeeze and deform the ferrule in order to secure the end fitting and lock all the elements together in the sealing and anchoring area of the cylindrical part 3.

Squeezing the ferrule or deformable metal sheet 7 with an outer wire pack replaces the need of swaging of the end fitting onto the composite hose as is done in known solutions. Hence, the use of expensive and very big swaging machines is avoided as well as the danger of creation of leak paths due to a relaxation of the swage elements.

FIG. 2 shows a detailed cross sectional view of the fluid-tight sealing areas of the end fitting of another embodiment according to the present invention.

FIG. 2 shows the cylindrical part 3 between the connection flange part 2 and the step 10. In this embodiment, there is only one sealing zone within the sealing area 4, the sealing zone 16. A pack 14 of sealing layers is placed in direct contact with the cylindrical part 3.

A gas-tight sealing is created by bonding one or more sealing layers over a continuous ring shaped bonding area 20, perpendicular to the cylindrical part axis 23 (shown in FIG. 1). Hence the pack 14 of sealing layers will be bonded continuously along the circumference of the cylindrical part 3. FIG. 2 shows also that above the pack 14 of sealing layers (and optionally one or more protection layers to protect the sealing layers), a small diameter wire pack 21 is placed that is used to add a radial compression force on the pack 14 of sealing layers in the sealing zone 16 of the cylindrical part 3, compressing the bonded area as well. In this embodiment a small diameter wire pack is chosen, however, it could also have been a wire pack of the same diameter as the inner wire 5 or even a larger diameter wire pack.

In embodiments where there are several sealing zones, the extra sealing zones can be considered as extra sealing barriers or redundancy sealing barriers for the first sealing zone 16. The other sealing zones would have the same configuration as the one described, with the inner pack of sealing layers being separated from an outer pack of sealing layers by protection layers 22.

In this particular embodiment, the sealing layers of the pack 14 can for example be wrapped films, tubular films or combinations thereof. Each pack can consist of up to 30 layers or more of wrapped films. Preferably at least one sealing layer in each sealing pack is of a tubular shape.

The inner most sealing layer of the sealing such as by pack 14 can be bonded to the cylindrical part 3 chemically, by gluing or by adding heat, like ultra sonic welding, to create a fluid-tight circumferential closed sealing barrier over the cylindrical part 3.

As the sealing layers in the pack 14 are made of the same material, they can be bonded together as earlier described by gluing, chemical bonding, ultra-sonic welding, etc. also to create a fluid-tight circumferential closed sealing barrier.

When the cylindrical part 3 is made of the same material as the sealing layers, all the sealing layers and the cylindrical part can be easily welded together, for example by ultrasonic welding.

If the cylindrical part is made of a different material than the material of the sealing layers, a coating of the same material as the sealing layers can be added in the sealing area of the metal cylindrical ring, so to ensure a good welding and bonding between the sealing layers and the cylindrical part.

Alternatively, if the sealing layers and the cylindrical part 3 are made of different materials, then the most inner sealing layer (or all sealing layers) can be bonded to the cylindrical part 3, for example with a glue or an adhesive. The glue or adhesive used could for example be epoxy-based or based on a synthetic chloroprene rubber or on a polyurethane elastomer, for example known under the trade name "Zebron" from the French company A.T.R. or "Adripene" from the US company Du Pont de Nemours. Alternatively, the adhesive could be in form of double sided adhesive tape that is added around the circumference of the cylindrical part 3 in a closed loop, being adhesive under both cryogenic and ambient temperatures. The inner most layer, bonded to the cylindrical part via an adhesive or glue, could as well be bonded at the same moment or in a later phase to the other sealing layers in the same sealing pack. This bonding together of the sealing layers can be done by adding an adhesive or glue between each sealing layer or by welding the sealing layers together in one or more steps by adding heat, for example via ultrasonic welding, so as to create a fluid-tight circumferentially closed sealing barrier.

The present invention is also related to a method of assembling a composite hose onto an end fitting.

This method comprises the steps of:
applying an inner helical wire on a cylindrical part of a hose end fitting
applying wrapped inner reinforcement layers
applying at least one sealing layers so that it is in direct contact with the cylindrical part of the hose end fitting
bonding the at least one sealing layer to the cylindrical part over a continuous, ring shaped bonding area.
applying a small diameter wire pack for radial compression of the sealing layer in the bonded area
applying wrapped outer reinforcement layers
applying an outer helical wire of the hose that covers the bonded area as well As mentioned earlier, a small diameter wire pack has been chosen, however, it could also have been a wire pack of same diameter or even a larger diameter wire pack.

This method could further include the step of adding a deformable metal sheet or ferrule over the outer wire on the end fitting and deform it by applying a radial compression force with a tight outer wire pack that is placed on top of the sheet or ferrule.

For redundancy reasons, the method could also comprise the step of creating a second sealing zone for a second sealing layer package, placed next to the first sealing zone and repeating the steps of the method, before the outer helical wire 8 is added. Hence the first and the second sealing zones could be considered as a primary and a secondary seal barrier, preventing leak-paths for the fluid transferred by the hose.

This configuration enables to have a leak free composite hose with a relatively limited thickness in the area of the end fitting, which could be used as an aerial hose or combined with an elastomeric outer hose segment to form a floating or submerged hose for transfer of cryogenic fluids.

Although particular embodiments of the invention have been described and illustrated herein, it is recognized that modifications and variations may readily occur to those skilled in the art, and consequently, it is intended that the claims be interpreted to cover such modifications and equivalents.

The invention claimed is:

1. A composite hose comprising a tubular body of flexible material for transfer of cryogenic fluid through the hose and to prevent fluid leakage through the body,
the tubular body comprising;
an inner wire helix spirally wound along the length of the hose,
an outer wire helix spirally wound along the length of the hose,
at least two reinforcing layers placed in between the inner and outer wire,
at least one sealing layer placed between two reinforcing layers, and
an end fitting at both ends of the tubular body, each end fitting provided with a part for connection to another hose and an elongated cylindrical part, the cylindrical part divided in an anchoring area for anchoring the tubular body and a static sealing area for fluid tight sealing of the hose, wherein a gas tight sealing is created by a bond bonding the at least one sealing layer to the cylindrical part over a ring shaped bonding area,
wherein an outer wire pack is placed over the outer wire to apply a radial compression force on the outer wire in the sealing area of the cylindrical part, and
wherein a deformable metal sheet or ferrule is placed between the outer wire and the outer wire pack.

2. A composite hose according to claim 1, wherein the at least one sealing layer is in direct contact with the cylindrical part.

3. A composite hose according to claim 1, wherein the bond is heat-formed.

4. A composite hose according to claim 3, wherein the bond is an ultrasonic weld.

5. A composite hose according to claim 1, wherein the bond is a glue or adhesive.

6. A composite hose according to claim 1, wherein the bond is a combination of a glue and being heat-formed.

7. A composite hose according to claim 6, wherein the bond between an inner sealing layer and the cylindrical part comprises glue and an ultrasonic weld bonds adjacent sealing layers.

8. A composite hose according to claim 7, wherein the bond between the inner sealing layer and the cylindrical part is a double sided adhesive tape.

9. A composite hose comprising a tubular body of flexible material for transfer of cryogenic fluid through the hose and to prevent fluid leakage through the body,
the tubular body comprising;
an inner wire helix spirally wound along the length of the hose,
an outer wire helix spirally wound along the length of the hose,
at least two reinforcing layers placed in between the inner and outer wire,
at least one sealing layer placed between two reinforcing layers, and
an end fitting at both ends of the tubular body, each end fitting provided with a part for connection to another hose and an elongated cylindrical part, the cylindrical part divided in an anchoring area for anchoring the tubular body and a static sealing area for fluid tight sealing of the hose, wherein on top of the at least one sealing layer an outer wire pack is placed for applying a radial compression force perpendicular to the tubular body axis onto the at least one sealing layer, wherein a deformable metal sheet or ferrule is placed between the outer wire and the outer wire pack.

10. A composite hose according to claim 9, wherein the sealing layers and the cylindrical part are bonded together by a bond.

11. A composite hose according to claim 9, wherein an additional outer wire pack is placed over the outer wire to apply a radial compression force on the outer wire in the sealing area of the cylindrical part.

12. A composite hose according to claim 9, wherein an additional outer wire pack adds a radial compression force on the tubular body in the anchoring area of the cylindrical part.

13. Composite hose according to claim 9, wherein the sealing area has a first sealing zone for an inner pack of sealing layers and a second sealing zone for an outer pack of sealing layers, said second sealing zone being closer to the another hose.

14. A composite hose according to claim 9, wherein the cylindrical part has a varying diameter, with the sealing area having a larger diameter that the anchoring area.

15. A composite hose according to claim 14, wherein the difference of diameter between the sealing area and the anchoring area corresponds to the diameter of the inner wire.

16. A composite hose according to claim 9 wherein the at least one sealing layer is a wrapped film.

17. A composite hose according to claim 9 wherein the at least one sealing layer is a film in tube form.

18. A composite hose according to claim 9 wherein the at least one sealing layer is a combination of wrapped films and films in tube form.

19. A composite hose according to claim 9 wherein the inner wire is fastened onto the anchoring area of the cylindrical part.

20. A composite hose according to claim 1, wherein the deformable metal sheet is placed between the outer wire and the outer wire pack.

21. A composite hose according to claim 1, wherein the deformable ferrule is placed between the outer wire and the outer wire pack.

22. A composite hose according to claim 9, wherein the deformable metal sheet is placed between the outer wire and the outer wire pack.

23. A composite hose according to claim 9, wherein the deformable ferrule is placed between the outer wire and the outer wire pack.

* * * * *